United States Patent

Takeyama et al.

[11] Patent Number: 5,194,184
[45] Date of Patent: Mar. 16, 1993

[54] FLAME-RETARDANT RESIN COMPOSITION

[75] Inventors: Yoshiharu Takeyama; Shuichi Yamagami, both of Tokyo, Japan

[73] Assignee: Idemitsu N.S.G. Co., Ltd., Yokkaichi, Japan

[21] Appl. No.: 840,409

[22] Filed: Feb. 24, 1992

[30] Foreign Application Priority Data

Mar. 5, 1991 [JP] Japan .................................. 3-62372

[51] Int. Cl.$^5$ ............................................ C09K 21/00
[52] U.S. Cl. .................................... 252/609; 252/604; 252/601; 428/921; 525/106; 524/436; 524/522; 524/582; 524/584
[58] Field of Search ............... 252/609, 604; 428/921; 525/106; 524/436

[56] References Cited

U.S. PATENT DOCUMENTS

| | | | |
|---|---|---|---|
| 4,139,476 | 2/1979 | Hancock | 252/8.1 |
| 4,254,177 | 3/1981 | Fulmer | 428/256 |
| 4,396,730 | 8/1983 | Imahashi | 523/200 |
| 4,397,759 | 8/1983 | Hancock | 252/609 |
| 4,615,831 | 10/1986 | Kanno et al. | 252/609 |
| 4,719,045 | 1/1988 | Ogawa et al. | 252/609 |
| 4,727,102 | 2/1988 | Scarso | 524/100 |
| 4,732,939 | 3/1988 | Hoshi et al. | 525/106 |
| 4,859,365 | 8/1989 | Peninger | 252/601 |
| 4,992,215 | 2/1991 | Green | 252/609 |
| 5,041,490 | 8/1991 | Sakon et al. | 524/414 |
| 5,057,367 | 10/1991 | Morii et al. | 428/389 |
| 5,091,608 | 2/1992 | John | 174/84 R |
| 5,094,781 | 3/1992 | Miyata et al. | 252/609 |

Primary Examiner—Richard D. Lovering
Assistant Examiner—Joseph D. Anthony
Attorney, Agent, or Firm—Frishauf, Holtz, Goodman & Woodward

[57] ABSTRACT

A flame-retardant resin composition comprising (i) a mixture comprising (A) 50 to 90% by weight of a polyolefin resin, (B) 10 to 50% by weight of a polyamide resin, (C) 1 to 5% by weight of a polyolefin resin modified by an unsaturated carboxylic acid or a derivative thereof, (D) 25 to 55% by weight of a hydrated metal oxide and (E) 0 to 10% by weight of antimony trioxide; the total of the polyolefin resin (A) and the polyamide resin (B) being from 30 to 74% by weight of the mixture (i); and (ii) glass fibers (F) in an amount of 18 to 70 parts by weight to 100 parts by weight of the mixture (i). The resin composition is not toxic and has an excellent flame-retardant property and a high mechanical strength.

18 Claims, No Drawings

FLAME-RETARDANT RESIN COMPOSITION

FIELD OF THE INVENTION

The present invention relates to a flame-retardant resin composition which is suitable as a non-halogen flame-retardant material with high mechanical strength.

BACKGROUND OF THE INVENTION

Hitherto, halogen compounds have generally been used for making polyolefins flame-retardant. However, recently because of the toxicity of halogen compounds, use of them is essentially prohibited in European countries.

Under the above described situation, non-halogen flame retardants containing metal hydroxides such as magnesium hydroxide, aluminium hydroxide or the like have variously been investigated for the purpose of making polyolefins flame-retardant without use of halogen-containing flame retardants.

However, addition of metal hydroxides to polyolefins involves a problem that the flame-retarding property of them is not always satisfactory even though an extremely large amount of metal hydroxide is added thereto and that the mechanical strength and moldability of polyolefins containing such a large amount of metal hydroxides would often decrease. Even though glass fibers are added to polyolefins, the fame-retarding property of them is not always improved. Further, even though antimony trioxide is added to polyolefins, the flame-retarding property of polyolefins is not always sufficient.

In order to reduce the amount of metal hydroxides to be added to polyolefins, there is known a method of using red phosphorus. However, red phosphorus generates a bad smell during use and additionally involves a safety problem.

SUMMARY OF THE INVENTION

The object of the present invention is to overcome the problems of conventional halogen-containing flame retardants in the prior art and to provide a halogen-free resin composition having an excellent flame-retarding property and having excellent moldability and mechanical strength.

Specifically, there is provided in accordance with the present invention a flame-retardant resin composition comprising (A) a polyolefin resin, (B) a polyamide resin, (C) a modified polyolefin resin, (D) a hydrated metal oxide, (E) an antimony trioxide and (F) glass fibers, which is characterized in that the proportion of glass fibers (F) is from 18 to 70 parts by weight to 100 parts by weight of a blend comprising from 30 to 74% by weight of a mixture composed of from 50 to 90% by weight of polyolefin resin (A) and from 10 to 50% by weight of polyamide resin (B), from 1 to 5% by weight of modified polyolefin resin (C), from 25 to 55% by weight of hydrated metal oxide (D) and from 0 to 10% by weight of antimony trioxide (E).

DETAILED DESCRIPTION OF THE INVENTION

As polyolefin resins to be used as the component (A) in the present invention, there are mentioned, for example, polyethylene resins and polypropylene resins Polyethylene resins usable in the present invention include homopolymers of ethylene and copolymers of ethylene and other $\alpha$-olefin(s).

Polypropylene resins usable in the present invention include homopolymers of propylene and copolymers (block or random copolymers) of propylene and other $\alpha$-olefin(s) such as ethylene.

Of those mentioned above, polypropylene resins, especially propylene homopolymers and random propylene/ethylene copolymers, are preferred as polyolefin resins to be used as the component (A) in the present invention. The melt index (MI) of such polypropylene resins for use in the present invention is not specifically limited, but is preferably 5 g/10 min or more.

As polyamide resins to be used as the component (B) in the present invention, there are mentioned, for example, 6-nylon, 6,6-nylon, 6,10-nylon, 12-nylon and 4,6-nylon. Especially preferred is 6-nylon. Such polyamide resins are desired to have a relative viscosity of 3.5 or less. The polyamide resins are used in the present invention as a flame retardant aid for increasing the flame-retarding property of the resin composition. By incorporating such polyamide resins into the composition of the present invention, the amount of the flame retardant to be in the composition may be reduced.

Regarding the proportion of the polyolefin resin (A) to the polyamide resin (B) in the composition of the present invention, the polyolefin resin (A) is from 50 to 90% by weight, while the polyamide resin (B) is from 10 to 50% by weight; preferably the former is from 60 to 80% by weight while the latter is from 20 to 40% by weight.

If the proportion of the polyolefin resin (A) is more than 90% by weight, the effect of the polyamide resin (B) as a flame retardant aid could not be attained so that the flame-retarding property of the composition would lower. On the contrary, if the proportion of the polyolefin resin (A) is less than 50% by weight, the melt viscosity of the base polymer would be high so that the moldability of the resin composition would decrease and, additionally, when the resin composition is impregnated into a glass mat for lamination, degree of impregnation of the composition would worsen.

The content of the mixture composed of the polyolefin resin (A) and the polyamide resin (B) in the composition of the present invention is to be from 30 to 74% by weight to the total amount of the components (A) to (E). If the mixture of (A) and (B) is less than 30% by weight to the total amount of the components (A) to (E), the moldability of the resin composition would worsen. On the contrary, if it is more than 74% by weight, the flame-retarding property of the composition would worsen. Anyhow, both the cases of overstepping the defined range are unfavorable.

Modified polyolefin resins to be used in the present invention as the component (C) have a function of increasing the compatibility between the above-mentioned polyolefin resin (A) and polyamide resin (B). For instance, those obtained by reacting a polyolefin resin and an unsaturated carboxylic acid or a derivative thereof in the presence of a radical generating agent can be used as such modified polyolefin resins.

Polyolefin resins to be used as the starting material for the modified polyolefin resins (C) may be the same ones as those referred to for the above-mentioned polyolefin resins (A). As modified polyolefin resins, for example, modified polyethylene resins or modified polypropylene resins can be used in the present invention.

Where the polyolefin resin (A) in the composition of the present invention is a polyethylene resin, the modified polyolefin resin (C) is desired to be a modified polyethylene resin; and where the former is a polypropylene resin, the latter is desired to be a modified polypropylene resin. The latter combination is especially preferred.

As radical generating agents to be used in preparing the modified polyolefin resins (C), for example, there are mentioned benzoyl peroxide, lauryl peroxide, azobisisobutyronitrile, cumene peroxide, α,α'-bis(t-butylperoxydiisopropyl)benzene, di-t-butyl peroxide, and 2,5-di(t-butylperoxy)hexane.

As unsaturated carboxylic acids and their derivatives to be used in preparing the modified polyolefin resins (C), maleic anhydride is especially preferred. In addition, maleic acid, itaconic acid, citraconic acid and anhydrides of the acids, as well as acrylic acid and sorbic acid may also be used.

The reaction method of preparing modified polyolefin resins (C) from the above-mentioned raw material components is not specifically defined. For instance, the polyolefin resin may be dissolved in xylene or the like hydrocarbon solvent before it is reacted; or modification of the resin may be effected by fusing and kneading the raw materials in the presence of no solvent.

The modified polyolefin resin (C) to be prepared as mentioned above is desired to have an acid addition of approximately from 0.1 to 14% by weight and to have an MI value of approximately from 0.5 to 300 g/10 min. The content of the modified polyolefin resin (C) in the composition is to be from 1 to 5% by weight to the total amount of the components (A) to (E).

If the content of the modified polyolefin resin (C) is less than 1% by weight, the compatibility between the polyolefin resin (A) and the polyamide resin (B) would worsen so that the mechanical strength of the resin composition would decline. On the contrary, even though it is more than 5% by weight, the property of the resin composition could no more be improved but the cost of the composition would be high unfavorably.

As examples of hydrated metal oxides to be used as the component (D) in the present invention, there are mentioned metal hydroxides such as Al(OH)$_3$, Mg(OH)$_2$ or Ca(OH)$_2$ as well as hydrates of metal oxides. Above all, preferred are metal oxides, especially Mg(OH)$_2$ (magnesium hydroxide).

The hydrated metal oxides as referred to herein include metal oxides having bound water in the molecule and metal compounds having hydroxyl group(s) capable of generating water by thermal decomposition.

The content of the hydrated metal oxide (D) in the composition of the present invention is to be from 25 to 55% by weight, preferably from 30 to 50% by weight, to the total amount of the components (A) to (E).

If the content of the hydrated metal oxide (D) is less than 25% by weight, the resin composition could not be flame-retardant. On the contrary, if it is more than 55% by weight, the moldability of the composition would decline. In particular, in the case, the degree of impregnation of the composition into a glass mat would decrease and the mechanical strength of the same would decline. Anyway, both the cases of overstepping the defined range are unfavorable.

The composition of the present invention contains antimony trioxide as the component (E). The content of the antimony trioxide (E) in the composition is to be from 0 to 10% by weight to the total amount of the components (A) to (E).

As the case may be, the composition of the present invention may not contain antimony trioxide. However, by adding antimony trioxide to the composition, the flame-retarding property of the composition increases. However, even though more than 10% by weight of antimony trioxide is added, increase of the flame-retarding property of the composition could no more be attained thereby but the cost of the composition would be higher unfavorably.

Further, the composition of the present invention contains glass fibers as the component (F).

As glass fibers to be in the composition, preferred are long glass fibers having a fiber length of 50 mm or more. Especially preferred is a non-woven mat made of long glass fibers. Glass fibers for use in the present invention are preferably surface-treated with a silane coupling agent or the like.

The content of glass fibers (F) in the composition of the present invention is to be from 18 to 70 parts by weight to 100 parts by weight of the total amount of the components (A) to (E). If the content of glass fibers (F) is less than 18 parts by weight, the mechanical strength of the composition would be insufficient. On the contrary, if it is more than 70 parts by weight, the moldability of the composition would noticeably worsen. Anyhow, both cases of operating outside of the defined range are unfavorable.

The flame-retardant resin composition of the present invention is basically composed of the above-mentioned components. In addition to them, the composition may further contain, if desired, other additives of antioxidants, weather-resisting agents, pigments and antistatic agent in such amounts that they do not interfere with the object of the present invention.

The flame-retardant resin composition of the present invention is composed of the above-mentioned components, and the method of preparing the composition is not specifically defined. Preferably, it may be prepared efficiently in accordance with the method mentioned below.

Briefly, in order to efficiently obtain the intended flame-retardant resin composition of the present invention, 100 parts by weight of a blend comprising from 30 to 74% by weight of a mixture composed of from 50 to 90% by weight of a polyolefin resin (A) and from 10 to 50% by weight of a polyamide resin (B), from 1 to 5% by weight of a modified polyolefin resin (C), from 25 to 55% by weight of a hydrated metal oxide (D) and from 0 to 10% by weight of an antimony trioxide (E) was kneaded to give a base resin, it is sheeted, and thereafter from 18 to 70 parts by weight of glass fibers (F) are applied to the resulting sheet by impregnation with fusing under pressure for impregnation, to finally obtain the intended resin composition of the present invention.

More precisely, the above-mentioned components (A) to (E) were blended in the defined proportion and then fused and kneaded to give a base resin. If desired, after the components (A) to (C) were mixed and kneaded, and thereafter the components (D) and (E) may be added thereto and kneaded to give a base resin.

The method for blending and kneading the components is not specifically defined. Preferably, they are kneaded with a double-screw kneader.

Next, the base resin thus obtained is sheeted and a determined amount of glass fibers (F) (especially, in the form of a glass mat) is added thereto by fusing under pressure and impregnation to obtain an intended flame-retardant resin composition. If desired., the glass fibers (F) may be added to the base resin during sheeting it.

The base resin may be sheeted by any desired method, and the thickness of the sheet to be formed is not specifically defined. In general, the sheet is desired to have a thickness of approximately from 0.5 to 3 mm.

For instance, for impregnating the base resin into glass fibers, a base resin sheet and glass fibers (e.g., glass mat) may be put between endless steel belts and are fused therebetween under pressure of 5 kg/cm$^2$G or more at a temperature higher than the melting point of the base resin (for example, at 250° to 300° C.) whereby the resin may be infiltrated into the glass fibers.

The flame-retardant composition of the present invention thus prepared is in the form of a sheet, and it may be applied to various uses by shaping it into any desired form or by cutting it into any desired dimension by any known method.

Next, the present invention will be explained in more detail by way of the following examples, which, however, are not intended to restrict the scope of the present invention.

EXAMPLE 1

100 parts by weight of a blend comprising 57 parts by weight of a mixture, as prepared by mixing polypropylene random copolymer (Idemitsu Polypro F-730N, having MI of 9 g/10 min; product by Idemitsu Petrochemical Co., Ltd.) as component (A) and 6-nylon (MC100L, having relative viscosity [$\eta$] of 2.2; product by Kanebo Co., Ltd.) as component (B) in a proportion of (A)/(B) of being 90/10 by weight, 3 parts by weight of modified polypropylene (Idemitsu Polytac H-1100P, product by Idemitsu Petrochemical Co., Ltd.) as component (C), and 40 parts by weight of magnesium hydroxide as component (D) was mixed in a tumbler mixer for 10 minutes.

The mixture thus obtained was fused and kneaded at 230° C. with a double-screw continuous kneader to form pellets. Then, the pellets were sheeted with a T-die sheeting machine into a sheet having a thickness of 0.5 mm.

100 parts by weight of the sheets and 40 parts by weight of glass mats made of long glass fibers each having a fiber diameter of 23 μm were laminated into a five-laminate structure (comprising three base resin sheet layers and two glass mat layers) and were fused under pressure of 10 kg/cm$^2$G at 280° C. so that the base resin was impregnated into the glass fiber mats. Thus, a sheet-like flame-retardant resin composition (flame-retardant resin composition sheet) having a thickness of 3.8 mm was obtained.

The sheet (with thickness of 3.8 mm) was cut into a desired dimension, heated at 250° C. for 4 minutes and molded by stamping to produce a box-like product having a length of 150 mm, a width of 250 mm, a depth of 90 mm and a wall thickness of 2.5 mm, whereupon the moldability of the sheet and the degree of impregnation of the base resin into the glass mat were evaluated. Next, test pieces were cut out from the molded product and were tested to determine the flame-retarding property and the flexural strength. The results obtained are shown in Table 1 below.

Physical properties of the test samples were determined and evaluated by the methods mentioned below.

(1) Flame-retarding Property

UL-94 Standard was applied. Test samples each having a thickness of 2.5 mm were used. HB indicates that the tested sample was flammable.

(2) Degree of impregnation

Impregnation of the matrix resin into the glass mat layer was checked with the naked eye as to whether the impregnated resin was uniform or not.

◯: No glass fibers were seen with the naked eye.

Δ: No glass fibers were seen with the naked eye, but when the test sample was bent with force, delamination was seen.

x : White glass fibers remained on the surface of the test sample.

(3) Flexural Strength

This was measured by ASTM D-790. A sample having a flexural strength of less than 900 kg/cm$^2$ is rejected.

(4) Moldability

When a sheet sample was molded into a box having a length of 150 mm, a width of 250 mm and a depth of 90 mm, by stamping, whereupon the moldability of the sample was evaluated.

◯: The sample was molded good

Δ: The sample was molded but the stamped edges were somewhat short molding and had some rough surfaces.

x: The sample could not be molded.

EXAMPLES 2 TO 10 AND COMPARATIVE EXAMPLES 1 TO 7

Various compositions were prepared in the same manner as in Example 1, except that the components as indicated in Table 1—1 and Table 1-2 below were used each in the amount also as indicated therein. The physical properties of the compositions were determined and evaluated, and the results are shown in Table 1—1 and Table 1-2.

TABLE 1-1

| | Components (wt. pts.) | | | | | |
|---|---|---|---|---|---|---|
| | (A)/(B) | (A) + (B) | (C) Modified PP | (D) Mg(OH)$_2$ | (E) SB$_2$O$_3$ | (F) |
| Example 1 | 90/10 | 57 | 3 | 40 | 0 | 40 |
| Example 2 | 80/20 | 57 | 3 | 40 | 0 | 40 |
| Example 3 | 70/30 | 57 | 3 | 40 | 0 | 40 |
| Example 4 | 60/40 | 57 | 3 | 40 | 0 | 40 |
| Example 5 | 50/50 | 57 | 3 | 40 | 0 | 40 |
| Comparative Example 1 | 100/0 | 57 | 3 | 40 | 0 | 40 |
| Comparative Example 2 | 40/60 | 57 | 3 | 40 | 0 | 40 |
| Comparative Example 3 | 70/30 | 59.5 | 0.5 | 40 | 0 | 40 |
| Example 6 | 70/30 | 67 | 3 | 30 | 0 | 40 |

TABLE 1-1-continued

| | Components (wt. pts.) | | | | | |
|---|---|---|---|---|---|---|
| | (A)/(B) | (A) + (B) | (C) Modified PP | (D) Mg(OH)$_2$ | (E) SB$_2$O$_3$ | (F) |
| Example 7 | 70/30 | 47 | 3 | 50 | 0 | 40 |
| Comparative Example 4 | 70/30 | 77 | 3 | 20 | 0 | 40 |
| Comparative Example 5 | 70/30 | 37 | 3 | 60 | 0 | 40 |
| Example 8 | 70/30 | 52 | 3 | 40 | 5 | 40 |
| Example 9 | 70/30 | 57 | 3 | 40 | 0 | 20 |
| Example 10 | 70/30 | 57 | 3 | 40 | 0 | 60 |
| Comparative Example 6 | 70/30 | 57 | 3 | 40 | 0 | 15 |
| Comparative Example 7 | 70/30 | 57 | 3 | 40 | 0 | 80 |

TABLE 1-2

| | Flame-retarding Property (UL-94) | Degree of Impregnation | Flexural Strength (kg/cm$^2$) | Moldability |
|---|---|---|---|---|
| Example 1 | V-1 | ○ | 900 | ○ |
| Example 2 | V-1 | ○ | 1000 | ○ |
| Example 3 | V-0 | ○ | 1200 | ○ |
| Example 4 | V-0 | ○ | 1300 | Δ |
| Example 5 | V-0 | Δ | 1300 | Δ |
| Comparative Example 1 | HB | ○ | 1200 | ○ |
| Comparative Example 2 | V-0 | x | 1300 | x |
| Comparative Example 3 | V-0 | x | 800 | x |
| Example 6 | V-1 | ○ | 1200 | ○ |
| Example 7 | V-0 | Δ | 1100 | Δ |
| Comparative Example 4 | HB | ○ | 1200 | ○ |
| Comparative Example 5 | V-0 | x | 1000 | x |
| Example 8 | V-0 | ○ | 1200 | ○ |
| Example 9 | V-1 | ○ | 950 | ○ |
| Example 10 | V-0 | Δ | 1300 | Δ |
| Comparative Example 6 | HB | ○ | 700 | ○ |
| Comparative Example 7 | V-0 | x | 1300 | x |

Since the flame-retardant resin composition of the present invention contains no halogen compound, it is not toxic and is extremely favorable from the safe and sanitary viewpoint. In addition, it has an extremely high degree of flame-retarding property.

Further, the flame-retardant resin composition of the present invention has high mechanical strength and has excellent moldability.

Therefore, the flame-retardant resin composition of the present invention is effectively utilized as raw materials for various high flame-retardant molded articles and sheets.

While the invention has been described in detail and with reference to specific embodiments thereof, it will be apparent to one skilled in the art that various changes and modifications can be made therein without departing from the spirit and scope thereof.

What is claimed is:

1. A flame-retardant resin composition comprising
(i) a mixture comprising (A) 50 to 90% by weight of a polyolefin resin, (B) 10 to 50% by weight of a polyamide resin, (C) 1 to 5% by weight of a polyolefin resin modified by an unsaturated carboxylic acid or a derivative thereof, (D) 25 to 55% by weight of a hydrated metal oxide and (E) 0 to 10% by weight of antimony trioxide; the total of said polyolefin resin (A) and said polyamide resin (B) being from 30 to 74% by weight of said mixture (i); and
(ii) glass fibers (F) in an amount of 18 to 70 parts by weight to 100 parts by weight of said mixture (i).

2. The flame-retardant resin composition as claimed in claim 1, in which the hydrated metal oxide (D) is magnesium hydroxide.

3. The flame-retardant composition as claimed in claim 1, wherein said polyolefin resin (A) is in an amount of 60 to 80% by weight of said mixture (i); said polyamide resin (B) is in an amount of 20 to 40% by weight of said mixture (i); and said hydrated metal oxide (D) is in an amount of from 30 to 50% by weight of said mixture (i).

4. The flame-retardant resin composition as claimed in claim 1, in which the glass fibers (F) are long glass fibers.

5. The flame-retardant resin composition as claimed in claim 4, in which the long glass fibers are in the form of a glass mat.

6. The flame-retardant resin composition as claimed in claim 1, in which the polyolefin resin (A) is a polypropylene resin and the modified polyolefin resin (C) is a modified polypropylene resin.

7. The flame-retardant composition as claimed in claim 6, wherein the unsaturated carboxylic acid or a derivative thereof is selected from the group consisting of maleic acid, itaconic acid, citraconic acid and anhydride thereof.

8. The flame-retardant composition as claimed in claim 6, wherein the unsaturated carboxylic acid is selected from the group consisting of acrylic acid and sorbic acid.

9. The flame-retardant composition as claimed in claim 8, wherein the hydrated metal oxide (D) is magnesium hydroxide and the glass fibers (F) are in the form of a mat.

10. The flame-retardant composition as claimed in claim 9 wherein the metal oxide (D) is present in an amount of 30 to 50% by weight, based on the total weight of said mixture.

11. The flame-retardant composition as claimed in claim 10, wherein the glass fibers (F) have a fiber length of 50 mm or more.

12. The flame-retardant composition as claimed in claim 11, wherein the polyolefin resin (C) has an acid addition of 0.1 to 14% by weight and a melt index value of 0.5 to 300 g/10 minutes.

13. The flame-retardant composition as claimed in claim 12, wherein said polyolefin resin (A) is in an amount of 60 to 80% by weight of said mixture (i); said polyamide resin (B) is in an amount of 20 to 40% by weight of said mixture (i); and said hydrated metal oxide (D) is in an amount of from 30 to 50% by weight of said mixture (i).

14. The flame-retardant composition as claimed in claim 12, wherein the antimony trioxide (E) is present in an amount of 5 to 10% by weight, based on the total weight of said mixture and the polyamide resin (B) is a nylon with a relative viscosity of 3.5 or less.

15. The flame-retardant composition as claimed in claim 14, wherein the polyamide resin (B) is selected from the group consisting of 6-nylon; 6,6-nylon; 6,10-nylon; 12-nylon and 4,6-nylon; the polyamide resin has a relative viscosity of 3.5 or less; the polyolefin resin (A) is selected from the group consisting of a polyethylene resin and a polypropylene resin; the polyolefin resin (C) comprises a polyethylene resin or a polypropylene resin; and the hydrated metal oxide is selected from the group consisting of $Al(OH)_3$, $Mg(OH)_2$ and $Ca(OH)_2$.

16. The flame-retardant composition as claimed in claim 15, wherein said polyolefin resin (A) is in an amount of 60 to 80% by weight of said mixture (i); said polyamide resin (B) is in an amount of 20 to 40% by weight of said mixture (i); and said hydrated metal oxide (D) is in an amount of from 30 to 50% by weight of said mixture (i).

17. The flame-retardant composition as claimed in claim 16, wherein said polyolefin resin (A) is polypropylene random copolymer, said polyamide resin (B) is 6-nylon; said polyolefin resin (C) is modified polypropylene; said hydrated metal oxide (D) is magnesium hydride.

18. The flame-retardant composition as claimed in claim 17, wherein per 100 parts by weight of said mixture (i), said mixture (i) contains 57 parts of polypropylene random copolymer, 3 parts of modified propylene (C) and 40 parts of magnesium hydroxide; the proportion of (A)/(B) in said mixture (i) being 90/10 by weight; and said mixture (i) was formed into sheets which were then laminated with 40 parts by weight of glass mats made of glass fibers per 100 parts of said sheets.

* * * * *